(12) United States Patent
Eshel et al.

(10) Patent No.: US 8,054,360 B2
(45) Date of Patent: Nov. 8, 2011

(54) DEVICE AND METHOD FOR PROVIDING A REFERENCE SIGNAL

(75) Inventors: Noam Eshel, Pardesiyya (IL); Zeituni Golan, Kfar Saba (IL)

(73) Assignee: Advasense Technologies Ltd., Ra'anana (IL)

( * ) Notice: Subject to any disclaimer, the term of this patent is extended or adjusted under 35 U.S.C. 154(b) by 451 days.

(21) Appl. No.: 12/363,818

(22) Filed: Feb. 2, 2009

(65) Prior Publication Data

US 2010/0194952 A1 Aug. 5, 2010

(51) Int. Cl.
*H04N 3/14* (2006.01)
*H04N 5/335* (2006.01)
*H04N 5/217* (2006.01)

(52) U.S. Cl. ........................................ 348/308; 348/241

(58) Field of Classification Search .................. 348/294, 348/308, 241, 229.1
See application file for complete search history.

(56) References Cited

U.S. PATENT DOCUMENTS

2006/0077141 A1* 4/2006 Kwon ............................ 345/77
* cited by examiner

*Primary Examiner* — Alicia M Harrington
(74) *Attorney, Agent, or Firm* — Oren Reches (57) ABSTRACT

A device that includes a pixel array and a sample and hold circuit configured to provide sampled current to the pixel array wherein the sample and hold circuit includes a first transistor, a capacitor and a pair of current mirrors. The pair of current minors are connected to the first transistor and wherein the capacitor is connected to a drain of the first transistor. The sample and hold circuit is configured to sample an input current during a sampling phase to provide a sampled current, wherein the sampling includes: providing the input current to the pair of current mirrors and allowing the capacitor to be charged to the capacitor voltage that is a function of the input current; store, during a hold phase, the capacitor voltage; wherein the capacitor voltage forces an output stage of the sample and hold circuit to output a current that is substantially equal to the sampled current; and utilize the pair of current mirrors to force the gate, source and drain voltages of the first transistor to be equal to each other during the hold phase.

12 Claims, 8 Drawing Sheets

DEVICE AND METHOD FOR PROVIDING A REFERENCE SIGNAL

FIELD OF THE INVENTION

The invention relates to methods for providing a reference signal.

BACKGROUND OF THE INVENTION

Digital cameras include a two-dimensional pixel arrays. A single pixel can include one or more photo-detectors as well as multiple transistors. Typical photo-detectors include photodiodes, photo transistors, photo-gates, hole accumulation diodes, pinned diodes, avalanche diodes, buried accumulation and transfer layer devices.

Various prior art pixels are known. The most commonly used pixels are either CCD pixels or CMOS pixels. Prior art CMOS pixels and two dimensional CMOS arrays are illustrated in the following U.S. patents which are incorporated herein by reference: U.S. Pat. No. 6,777,660 of Lee, U.S. Pat. No. 6,762,401 of Lee, U.S. Pat. No. 6,567,495 of Harada, U.S. Pat. No. 6,750,912 of Tennant et al., U.S. Pat. No. 6,697,111 of Kozlowski et al., U.S. Pat. No. 6,665,013 of Fossum et al., U.S. Pat. No. 6,587,142 of Kozlowski et al., U.S. Pat. No. 6,538,245 of Kozlowski, U.S. Pat. No. 6,532,040 of Kozlowski et al., U.S. Pat. No. 5,892,540 of Kozlowski et al., U.S. Pat. No. 5,238,276 of Dhuse et al., U.S. Pat. No. 6,326,230 of Pain et al., and European patent application EP1881692A2 titled "Methods for reading a pixel and for writing to a pixel and a device having pixel reading capabilities and pixel writing capabilities" which is incorporated herein by reference.

The pixels that form the pixel array are usually arranged in columns. Pixels that belong to the same pixel column may share various control and feedback signals.

The pixel columns are usually activated in a pipeline manner—while some pixel columns are reset other pixel columns are read ad yet other pixel columns undergo an integration phase. Typically, there is a relatively long time gap between the reset phase of a certain pixel column to a read phase of that pixel column.

Reference voltages are provided to pixels and to pixel readout circuits during the reset, read and integration phases. These reference voltages can affect the outcome of the reset and read phases, especially when applying correlated double sampling techniques.

Highly stable reference voltage sources are relatively expensive and their complexity can increase as a function of the number of pixel columns. Unstable reference voltage sources can output an unstable reference voltage that can vary between a reset phase of a pixel column to a read phase of that pixel column.

There is a need to provide efficient methods to provide reference signals to groups of pixels and to pixel readout circuits.

SUMMARY OF THE INVENTION

A method for providing a sampled current to pixels of a pixel array, the method includes: sampling an input current during a sampling phase to provide a sampled current, wherein the sampling comprises: providing the input current to a pair of current mirrors that are connected to an first transistor; and allowing a capacitor that is coupled to a drain of the first transistor to be charged to the capacitor voltage that is a function of the input current; storing, during a hold phase, the capacitor voltage; wherein the capacitor voltage forces an output stage of the sample and hold circuit to output a current that is substantially equal to the sampled current; and using the pair of current mirrors to force the gate, source and drain voltages of the first transistor to be equal to each other during the hold phase.

The method can include grounding a bulk of the first transistor during the sampling phase; disconnecting the bulk of the first transistor from the ground during the hold phase; and disconnecting the gate of the first transistor from an input current input during the hold phase.

The first transistor can be an NMOS transistor or a PMOS transistor.

The method can include providing a sample and hold circuit; wherein the pair of current mirrors comprises a fifth transistor, a sixth transistor, a seventh transistor and an eight transistor; wherein the sample and hold circuit further comprises a second transistor, a third transistor, a fourth transistor, a ninth transistor, a tenth transistor, an eleventh transistor, and a first till eighth switches; wherein a source of the first transistor is connected to one end of the first switch; a second end of the first switch is connected to an input node of the sample and hold circuit, to first end of the eighth switch and to a first end of the seventh switch; a second end of the eighth switch is connected to the ground; a second end of the seventh switch is connected to a drain of the fifth transistor; the input node of the sample and hold circuit is connected to an input current source; a gate of the first transistor is connected to one end of the fourth switch and to a first end of the third switch; a second end of the fourth switch is connected to a supply source; a second end of the third switch is connected to a gate of the second transistor, to the drain of the second transistor and to a first end of the second switch; a second end of the second switch is connected to a first end of the first switch and to a source of the first transistor; sources of the second transistor, the fourth transistor, the fifth transistor, the sixth transistor and the ninth transistor are grounded; sources of the third transistor, the seventh transistor and the eighth transistor are connected to the supply source; gates of the third transistor, the seventh transistor and the eighth transistor are connected to each other and to a drain of the eighth transistor; gates of the fifth transistor, the sixth transistor and the ninth transistor are connected to each other, to a drain of the first transistor and to a first end of the capacitor; a second end of the capacitor is grounded; a drain of the seventh transistor is connected to a drain of the fourth transistor, to a gate of the fourth transistor, and to a second end of the fifth switch; a bulk of the first transistor is connected in parallel to first ends of the fifth and the sixth switches; and a second end of the sixth switch is grounded.

The method can include closing the first, fourth and seventh switches during the sample phase; opening the first, fourth and seventh switches during the hold phase; closing the second, third and eighth switches during the hold phase and opening the second, third and eighth switches during the sample phase.

The method can include grounding, during the sample phase, the bulk of the first transistor by the sixth switch; and connecting, during the hold phase and by the fifth switch, the bulk of the first transistor to the gate of the fourth transistor.

A device is provided. It can include: a pixel array and a sample and hold circuit configured to provide sampled current to the pixel array; wherein the sample and hold circuit comprises a first transistor, a capacitor and a pair of current mirrors; wherein the pair of current mirrors are coupled to the first transistor and wherein the capacitor is coupled to a drain of the first transistor; wherein the sample and hold circuit is configured to: sample an input current during a sampling phase to provide a sampled current, wherein the sampling comprises: providing the input current to the pair of current mirrors and allowing the capacitor to be charged to the capacitor voltage that is a function of the input current; store, during a hold phase, the capacitor voltage; wherein the capacitor voltage forces an output stage of the sample and hold circuit to output a current that is substantially equal to the sampled current; and utilize the pair of current mirrors to force the gate, source and drain voltages of the first transistor to be equal to each other during the hold phase.

The sample and hold circuit can be configured to ground a bulk of the first transistor during the sampling phase; disconnect the bulk of the first transistor from the ground during the hold phase; and disconnect the gate of the first transistor from an input current input during the hold phase.

The pair of current mirrors can include a fifth transistor, a sixth transistor, a seventh transistor and an eight transistor The sample and hold circuit can further include a second transistor, a third transistor, a fourth transistor, a ninth transistor, a tenth transistor, an eleventh transistor, and a first till eighth switches; wherein a source of the first transistor is connected to one end of the first switch; a second end of the first switch is connected to an input node of the sample and hold circuit, to first end of the eighth switch and to a first end of the seventh switch; a second end of the eighth switch is connected to the ground; a second end of the seventh switch is connected to a drain of the fifth transistor; the input node of the sample and hold circuit is connected to an input current source; a gate of the first transistor is connected to one end of the fourth switch and to a first end of the third switch; a second end of the fourth switch is connected to a supply source; a second end of the third switch is connected to a gate of the second transistor, to the drain of the second transistor and to a first end of the second switch; a second end of the second switch is connected to a first end of the first switch and to a source of the first transistor; sources of the second transistor, the fourth transistor, the fifth transistor, the sixth transistor and the ninth transistor are grounded; sources of the third transistor, the seventh transistor and the eighth transistor are connected to the supply source; gates of the third transistor, the seventh transistor and the eighth transistor are connected to each other and to a drain of the eighth transistor; gates of the fifth transistor, the sixth transistor and the ninth transistor are connected to each other, to a drain of the first transistor and to a first end of the capacitor; a second end of the capacitor is grounded; a drain of the seventh transistor is connected to a drain of the fourth transistor, to a gate of the fourth transistor, and to a second end of the fifth switch; a bulk of the first transistor is connected in parallel to first ends of the fifth and the sixth switches; and a second end of the sixth switch is grounded The first, fourth and seventh switches can be closed during the sample phase and are opened during the hold phase.

The second, third and eighth switches can be closed during the hold phase and are open during the sample phase.

The during the sample phase the sixth switch can ground the bulk of the first transistor and during the hold phase the fifth switch can connect the bulk of the first transistor to the gate of the fourth transistor.

BRIEF DESCRIPTION OF THE DRAWINGS

The present invention will be understood and appreciated more fully from the following detailed description taken in conjunction with the drawings in which.

DETAILED DESCRIPTION OF THE DRAWINGS

Pixels output analog signals and should be provided with accurate analog signals during their operation.

Low analog voltages can be provided by sample and hold circuits that sample signals during a quiet period during which digital noises and analog noises are low and hold the sampled signals by a low leakage switch. The sampled signals can be provided during noisy phases such as a readout phase of a group of pixel. Thus, despite power rail noises and especially despite power rail spikes—a quiet samples signal can be provided. The analog signals that are sampled by the sample and hold circuits can be generated by analog circuits that are characterized by a long response period. These analog circuits overcome noises after a relatively long period. Hence—their outputs are sampled during quiet periods and the sampled (quiet) analog signal is outputted by the sample and hold circuits during noisy periods. A non limiting example of such analog circuits is pixel emulators. After the sampling the analog circuits can be connected to the ground.

The samples and hold circuit includes a low leakage switch and a capacitor. The low leakage switch includes an NMOS transistor and a bootstrap circuit that provides a voltage that is higher than the supply voltage in order to allow the NMOS transistor to output a high output voltage.

Figure 1:
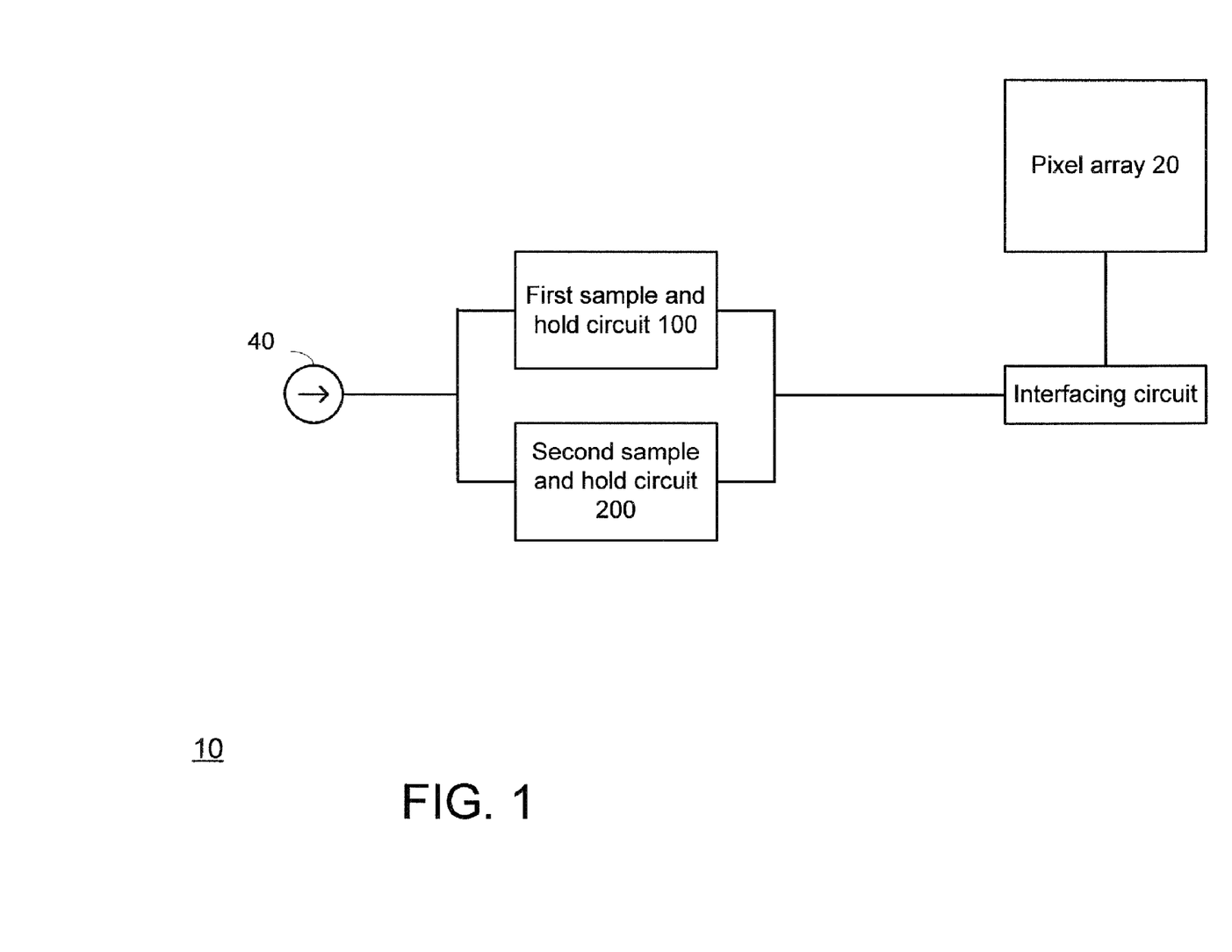
FIG. 1 illustrates a device according to various embodiments of the invention.

FIG. 1 illustrates a device 10 according to an embodiment of the invention.

Device 10 includes pixel array 20, interfacing circuit 30, and first and second sample and hold circuits 100 and 200. First sample and hold circuit 100 includes NMOS switch 111 while second sample and hold circuit 200 includes a PMOS switch 211.

Interfacing circuit 30 can be a multiplexer but this is not necessarily so. Interfacing circuit 30 directs a sampled voltage to at least one pixel of the pixel array 20 from sample and hold circuit 100.

Figure 2:
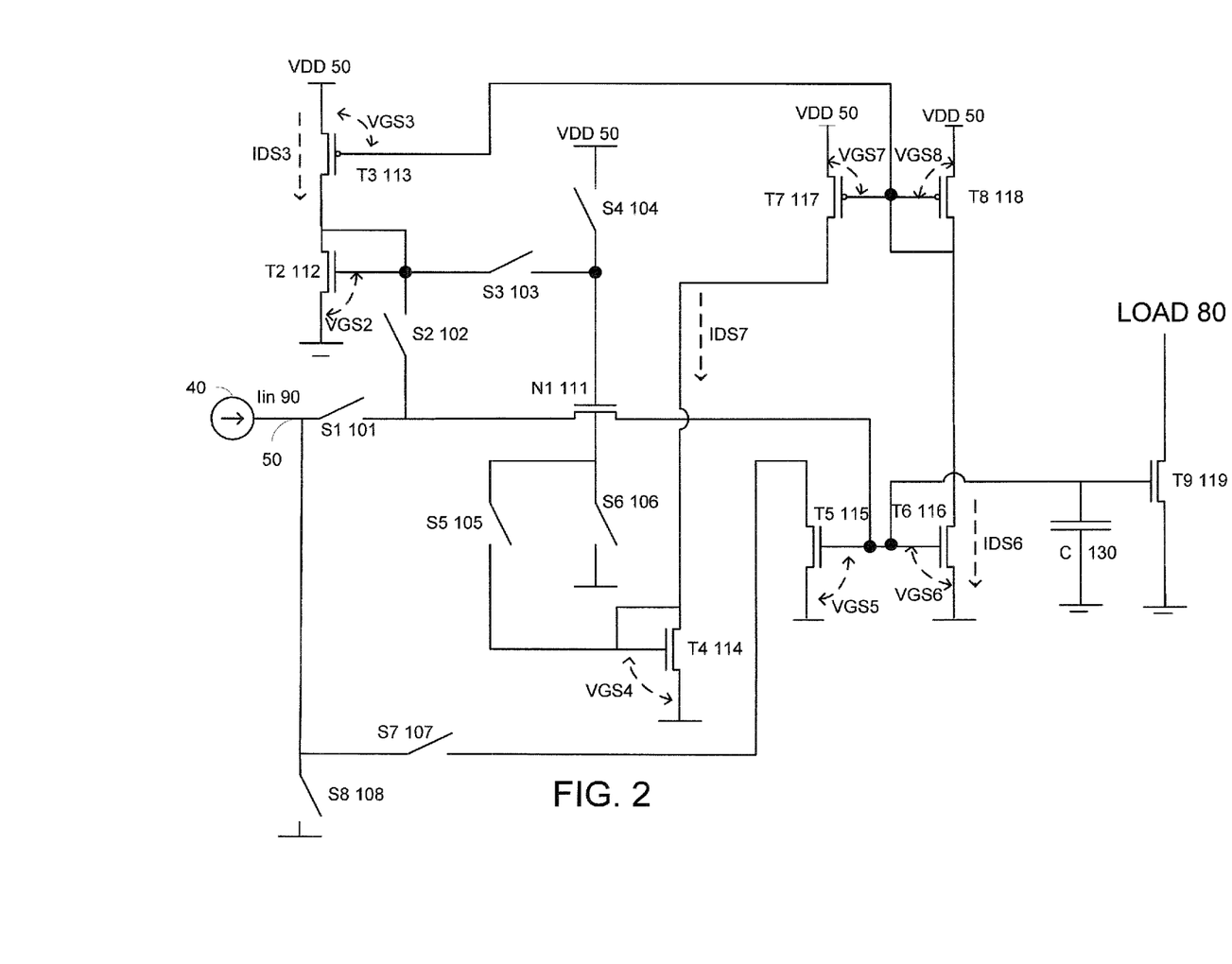
FIG. 2 illustrates a first sample and hold circuit according to an embodiment of the invention.
Figure 3:
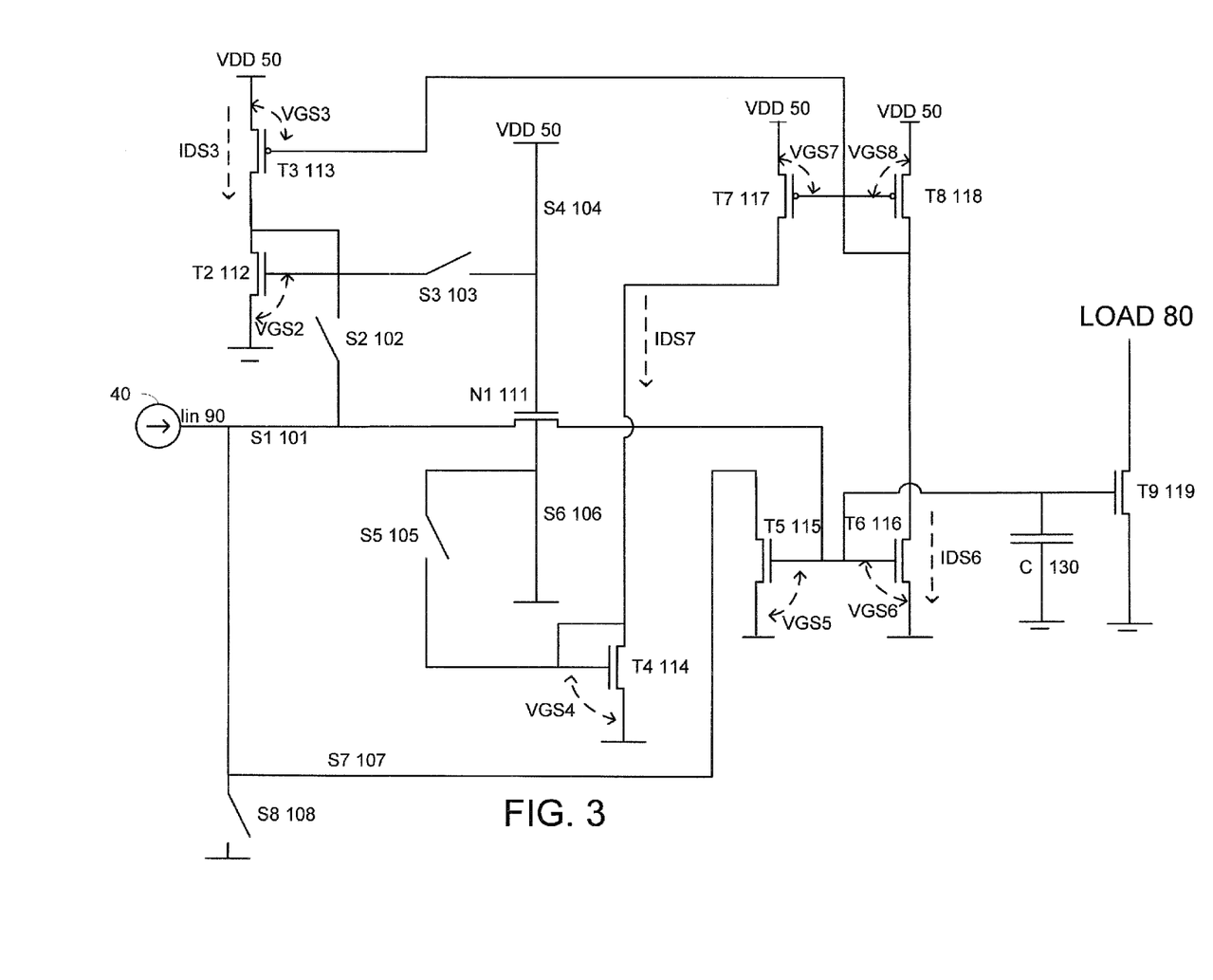
FIG. 3 illustrates a first sample and hold circuit during a sample phase according to an embodiment of the invention.
Figure 4:
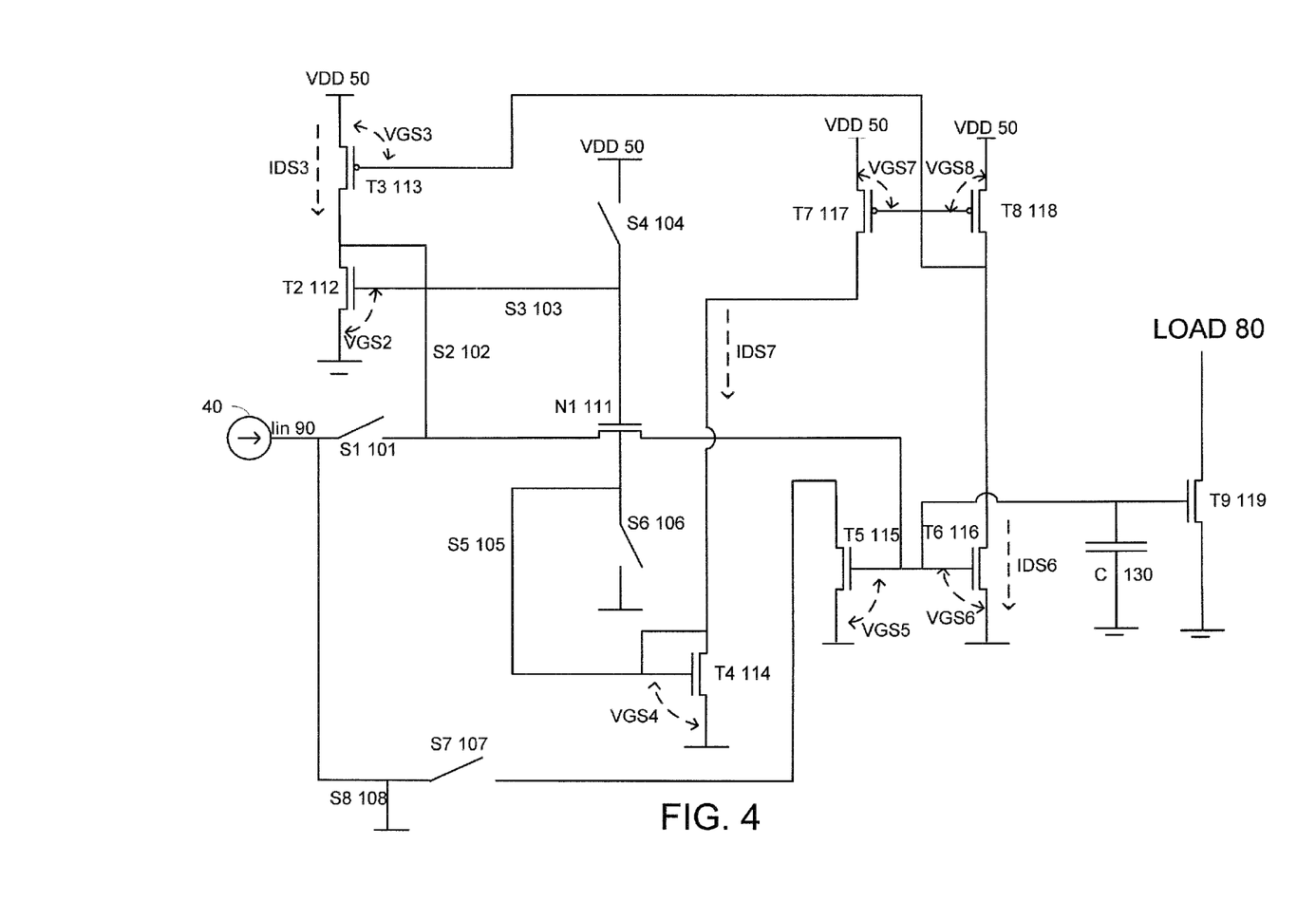
FIG. 4 illustrates a first sample and hold circuit during a hold phase according to an embodiment of the invention.

Referring to FIGS. 2-4, sample and hold circuit 100 includes first till ninth transistors 111-119, first till sixth switches S1-S6 101-106, and capacitor 130. First transistor 111, second transistor 112, fourth transistor 114, fifth transistor 115, sixth transistor 116 and ninth transistor 119 are NMOS transistors. Third transistor 113, seventh transistor 117 and eighth transistor 118 are PMOS transistors.

The source of first transistor 111 is connected to one end of first switch 101. The second end of first switch 101 is connected to input node 50 of first sample and hold circuit, to first end of eighth switch S8 108 and to a first end of seventh switch S7 108. The second end of eighth switch S8 108 is connected to the ground. The second end of seventh switch S7 107 is connected to the drain of fifth transistor T5 115.

Input node 50 is connected to input current source 40. The gate of first transistor 111 is connected to one end of fourth switch 104 and to a first end of third switch 103. The second end of fourth switch is connected to supply source VDD 50. The second end of third switch 103 is connected to the gate of second transistor 112, to the drain of second transistor 102 and to a first end of second switch 102. The second end of second switch 102 is connected to the first end of first switch 101 and to the source of first transistor 111.

The sources of second transistor 112, fourth transistor 114, fifth transistor 115, sixth transistor 116 and ninth transistor are grounded. The sources of third transistor 113, seventh transistor 117 and eighth transistor 118 are connected to supply source VDD 50.

The gates of third transistor 113, seventh transistor 117 and eighth transistor 118 are connected to each other and to the drain of eighth transistor 118. The gates of fifth transistor 115, sixth transistor 116 and ninth transistor 119 are connected to each other, to the drain of first transistor 111 and to a first end of capacitor 130. The second end of capacitor 130 is grounded.

The drain of seventh transistor 117 is connected to the drain of fourth transistor 114, to the gate of fourth transistor 114, and to a second end of fifth switch 105.

The bulk of first transistor 111 is connected in parallel to first ends of fifth and sixth switches 105 and 106. The second end of sixth switch is grounded.

First, fourth and seventh switches 101, 104 and 107 are closed (provide connectivity between their ends) during the sample phase and are opened (disconnected) during the hold phase.

Second, third and eighth switches 102, 103 and 108 are closed (provide connectivity between their ends) during the hold phase and are open (disconnected) during the sample phase.

During the sample phase sixth switch 106 grounds the bulk of first transistor 111 and during the hold phase fifth switch 105 connects the bulk of first transistor to the gate of fourth transistor 104.

During the sample phase the gate of first transistor 111 is connected (via fourth switch 104) to VDD 50 and is conductive. The source drain current that flows through first transistor 111 is very small—as it can not flow through the gates of fifth and sixth transistors 115 and 116 that are connected to the drain of first transistor—thus Iin 90 from input node 50 flows through the drain of fifth transistor 115 so that IDS5 substantially equals Iin 90.

During the hold phase eighth switch S8 108 grounds input node 50 and seventh switch S7 107 disconnects the drain of fifth transistor 115 from the input node.

During the sample phase seventh switch S7 107 connects input node to the drain of fifth transistor 115 and eighth switch S8 108 disconnects the input node 50 from the ground.

Fifth and sixth transistors operate as a first current mirror that mirrors the drain source current (IDS5) of fifth transistor 115 to the drain source current (IDS6) of sixth transistor 116. During the sample stage IDS5 substantially equals Iin 90—thus the first current mirror mirrors Iin 90 to IDS6.

Seventh and eighth transistors operate as a second current mirror that mirrors the drain source current (IDS8) of eighth transistor 118 to the drain source current (IDS7) of seventh transistor 117.

Sixth transistor 116 is connected in a serial manner to eighth transistor 118 so that their drain source currents IDS6 and IDS8 equal each other. Accordingly, during the sample phase IDS8 substantially equals Iin 90 and IDS7 also substantially equals Iin 90.

During the sample stage IDS5 substantially equals Iin 90—thus the first current mirror mirrors Iin 90 to IDS6.

Capacitor 130 is charged to the gate source voltage (VGS6) of the sixth transistor—a gate source voltage that is developed where the drain source current (IDS6) of sixth transistor 116 equals Iin 90.

The gate source voltage (VGS7) of seventh transistor 117 equals the gate source voltage (VGS3) of third transistor 113. Accordingly the drain source current (IDS3) of third transistor 113 equals the drain source current (IDS7) of seventh transistor 117.

Second transistor 112 is connected in a serial manner to third transistor 113 so that their drain source currents IDS2 and IDS3 equal each other and are substantially equal to Iin 90.

During the hold phase the source and drain of first transistor 111 are connected to each other. In addition, as will be illustrated below the gate voltage (which is also the source voltage) of first transistor 111 are equal to the bulk voltage and to the drain voltage of first transistor 111—thus first transistor is non-conductive and does not leak.

The bulk is connected to the gate of fourth transistor 114—its voltage equals the gate source voltage (VGS4)—as the source of fourth transistor 114 is grounded. The drain source current (IDS4) of fourth transistor 114 equals the drain source current of seventh transistor 117. The drain source current of seventh transistor 117 equals the drain source currents (IDS2, IDS3) of third and second transistors 112 and 113

Accordingly—the gate source voltage (VGS2) of second transistor 112 equals the gate source voltage (VGS4) of fourth transistor 114. Accordingly—the voltage of the gate and drain of first transistor also equals VGS4.

VGS4 also equals VGS5 as IDS5 equals IDS4. Thus—the voltage of the drain of first transistor 111 also equals VGS4.

Capacitor 130 is maintained at a voltage that equals about VGS5—and the gate source voltage (VGS9) of ninth transistor 119 is also maintained at this voltage. Fifth transistor 115 continues to receive Iin and the current supplied by ninth transistor 119 is maintained to be substantially equal to Iin 90.

Figure 5:
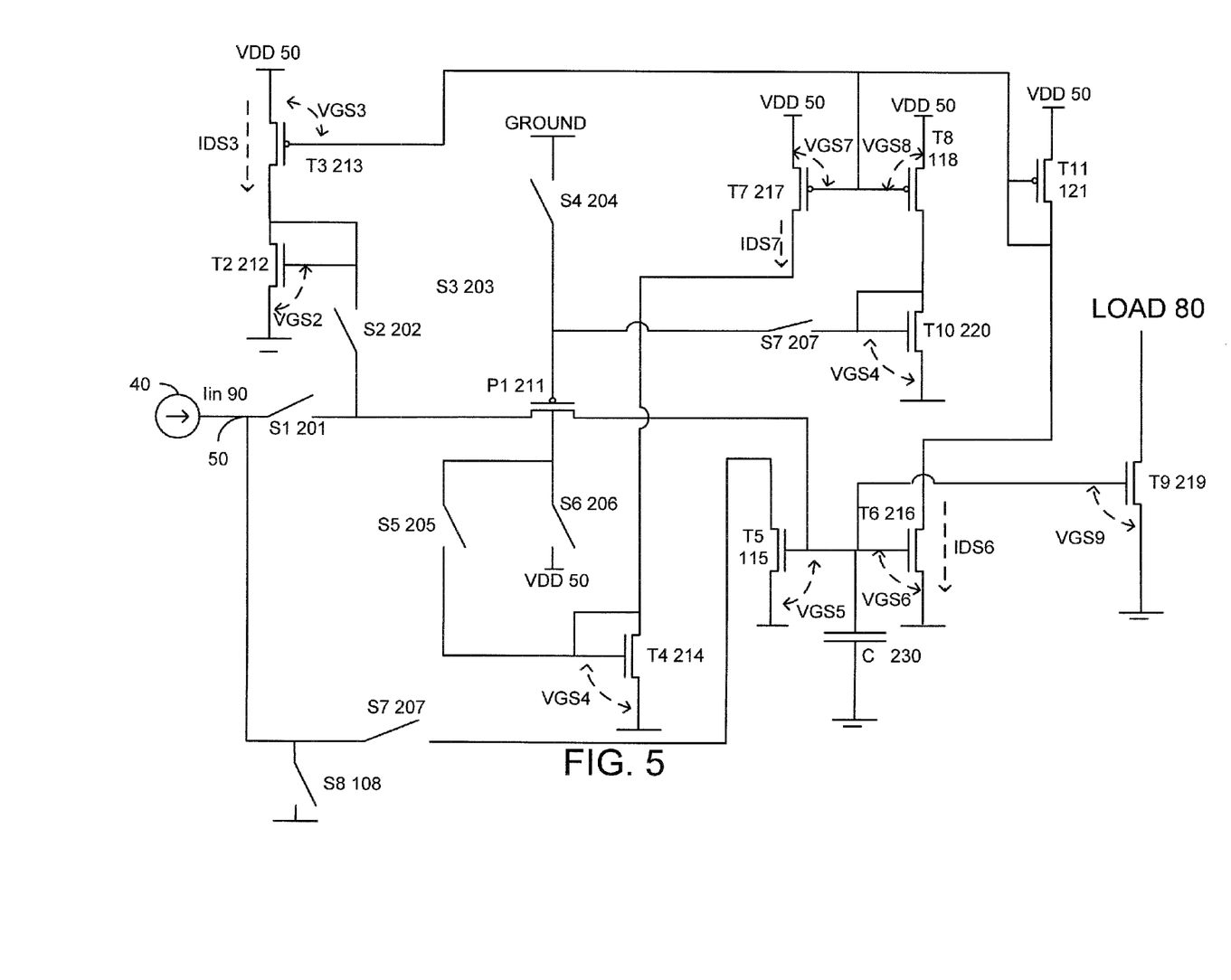
FIG. 5 illustrates a first sample and hold circuit according to an embodiment of the invention.
Figure 6:
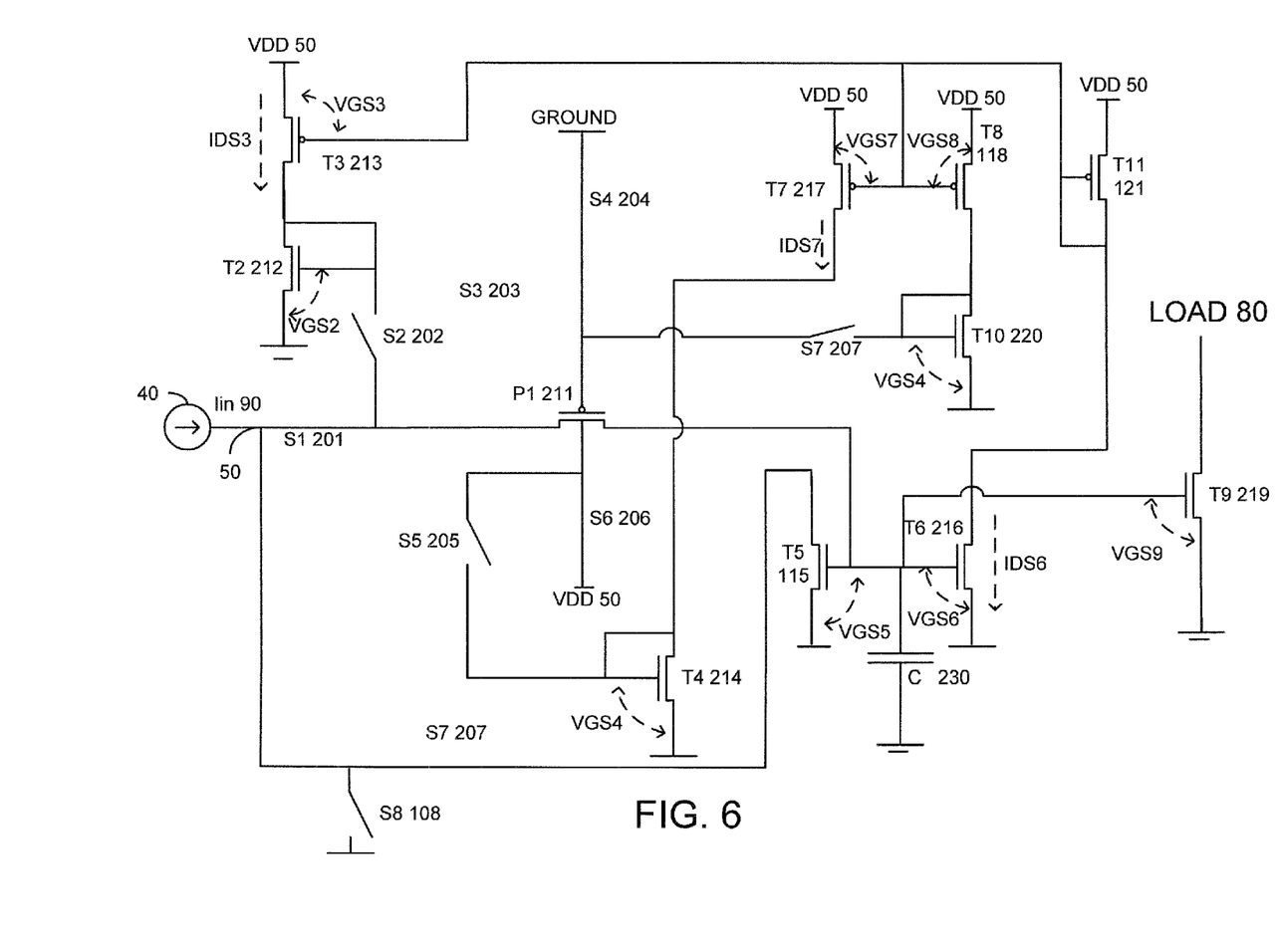
FIG. 6 illustrates a first sample and hold circuit during a sample phase according to an embodiment of the invention.
Figure 7:
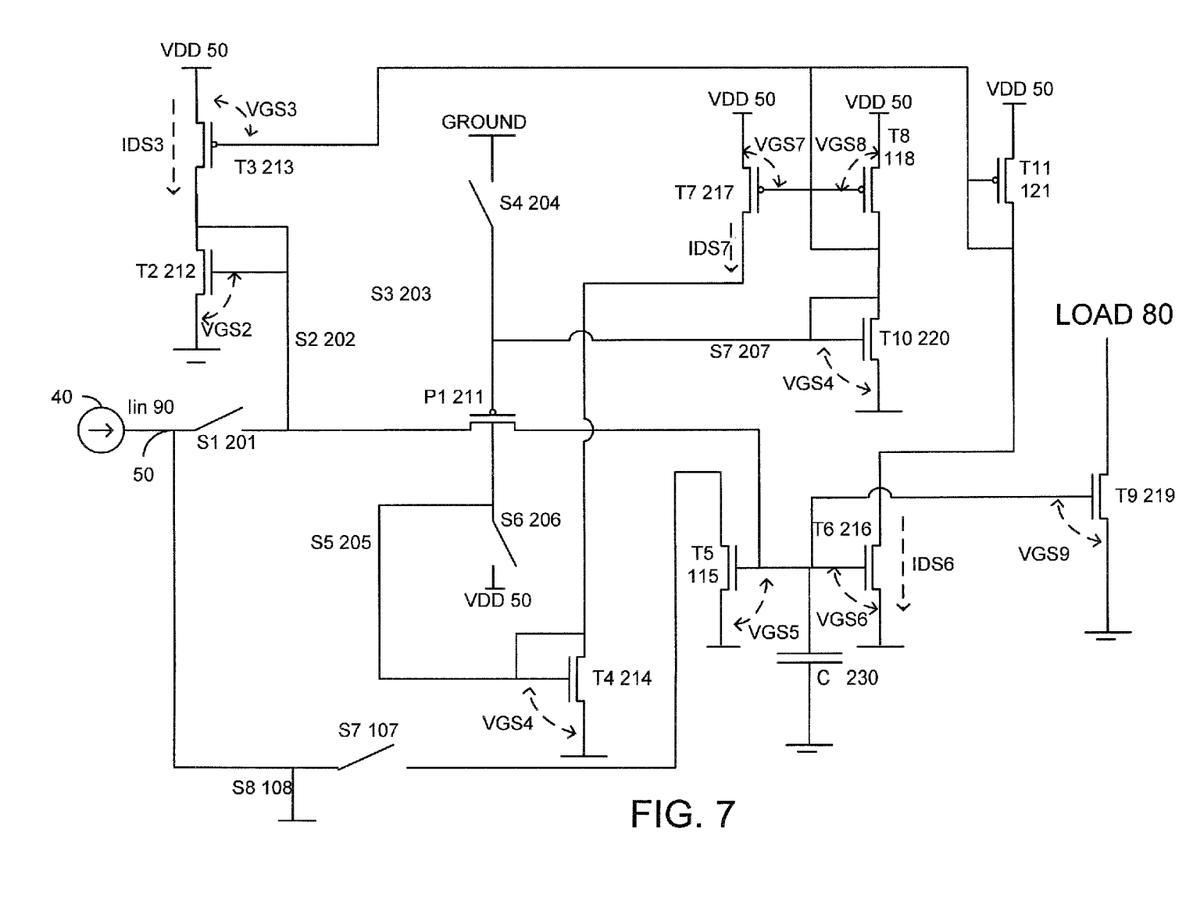
FIG. 7 illustrates a first sample and hold circuit during a hold phase according to an embodiment of the invention.

FIG. 5 illustrate sample and hold circuit 100', FIG. 6 illustrates sample and hold circuit 100' during a sample phase and FIG. 7 illustrates sample and hold circuit 100' during a hold phase according to an embodiment of the invention.

Sample and hold circuit 100' is analogues to sample and hold circuit 100, although there are some differences, as listed below:
  a. First transistor 111 of sample and hold circuit 100 is replaced by a PMOS transistor P1 211.
  b. The gate and source of eighth transistor T8 118 are disconnected from each other.
  c. Sixth switch S6 106 is connected to VDD 50 (and not grounded).
  d. Fourth switch S4 104 is connected to the ground (and not to VDD 50).

Figure 8:
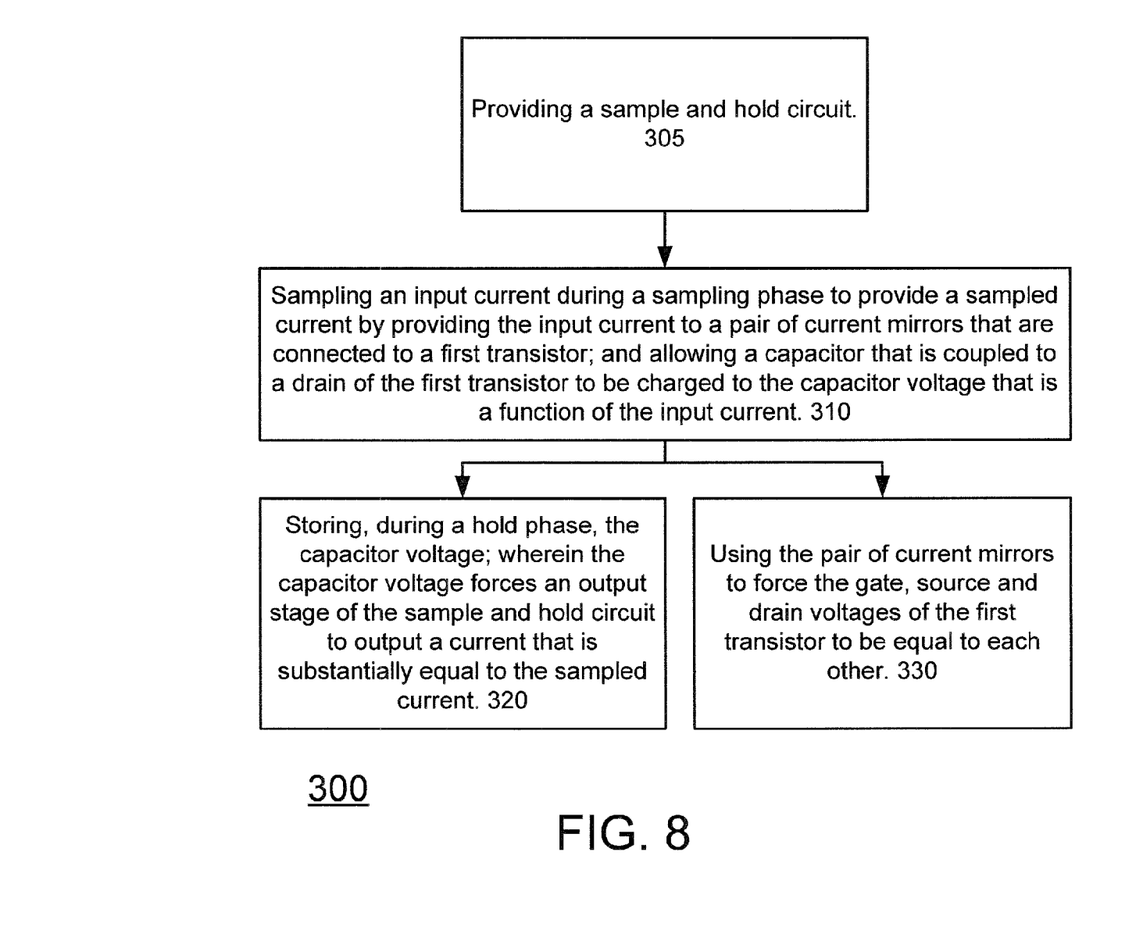
FIG. 8 is a flow chart according to an embodiment of the invention.

FIG. 8 illustrates method 300 according to an embodiment of the invention.

Method 300 starts by stage 305 of providing a sample and hold circuit. The sample and hold circuit can be, for example, sample and hold circuit 100 or sample and hold circuit 110'.

For example, stage 305 can include providing a sample and hold circuit; wherein the pair of current mirrors comprises a fifth transistor, a sixth transistor, a seventh transistor and an eight transistor; wherein the sample and hold circuit further comprises a second transistor, a third transistor, a fourth transistor, a ninth transistor, a tenth transistor, an eleventh transistor, and a first till eighth switches; wherein a source of the first transistor is connected to one end of the first switch; a second end of the first switch is connected to an input node of the sample and hold circuit, to first end of the eighth switch and to a first end of the seventh switch; a second end of the eighth switch is connected to the ground; a second end of the seventh switch is connected to a drain of the fifth transistor; the input node of the sample and hold circuit is connected to an input current source; a gate of the first transistor is connected to one end of the fourth switch and to a first end of the third switch; a second end of the fourth switch is connected to a supply source; a second end of the third switch is connected to a gate of the second transistor, to the drain of the second transistor and to a first end of the second switch; a second end of the second switch is connected to a first end of the first switch and to a source of the first transistor; sources of the second transistor, the fourth transistor, the fifth transistor, the sixth transistor and the ninth transistor are grounded; sources of the third transistor, the seventh transistor and the eighth transistor are connected to the supply source; gates of the third transistor, the seventh transistor and the eighth transistor are connected to each other and to a drain of the eighth transistor; gates of the fifth transistor, the sixth transistor and the ninth transistor are connected to each other, to a drain of the first transistor and to a first end of the capacitor; a second end of the capacitor is grounded; a drain of the seventh transistor is connected to a drain of the fourth transistor, to a gate of the fourth transistor, and to a second end of the fifth switch; a bulk of the first transistor is connected in parallel to first ends of the fifth and the sixth switches; and a second end of the sixth switch is grounded.

Stage 305 is followed by stage 310 of sampling an input current during a sampling phase to provide a sampled current.

Stage 310 includes providing the input current to a pair of current mirrors that are connected to a first transistor; and allowing a capacitor that is coupled to a drain of the first transistor to be charged to the capacitor voltage that is a function of the input current.

Stage 310 is followed by stages 320 and 330.

Stage 320 includes storing, during a hold phase, the capacitor voltage; wherein the capacitor voltage forces an output stage of the sample and hold circuit to output a current that is substantially equal to the sampled current.

Stage 330 includes using the pair of current mirrors to force the gate, source and drain voltages of the first transistor to be equal to each other.

Stage 310 can include grounding a bulk of the first transistor during the sampling phase.

Stage 330 can include disconnecting the bulk of the first transistor from the ground during the hold phase; and disconnecting the gate of the first transistor from an input current input during the hold phase.

Stage 310 can include closing the first, fourth and seventh switches during the sample phase and opening the second, third and eighth switches during the sample phase.

Stage 320 can include opening the first, fourth and seventh switches during the hold phase and closing the second, third and eighth switches during the hold phase.

Stage 310 can include grounding, during the sample phase, the bulk of the first transistor by the sixth switch.

Stage 330 can include connecting, during the hold phase and by the fifth switch, the bulk of the first transistor to the gate of the fourth transistor.

Method 300 can be executed by sample and hold circuit 100 or by sample and hold circuit 100'. The first transistor can be a PMOS transistor or an NMOS transistor.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps from those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method for providing a sampled current to pixels of a pixel array, the method comprising:
    sampling an input current during a sampling phase to provide a sampled current, wherein the sampling comprises: providing the input current to a pair of current mirrors that are coupled to an first transistor; and allowing a capacitor that is coupled to a drain of the first transistor to be charged to the capacitor voltage that is a function of the input current;
    storing, during a hold phase, the capacitor voltage; wherein the capacitor voltage forces an output stage of the sample and hold circuit to output a current that is substantially equal to the sampled current; and
    using the pair of current mirrors to force the gate, source and drain voltages of the first transistor to be equal to each other during the hold phase.

2. The method according to claim 1 comprising: grounding a bulk of the first transistor during the sampling phase, discoupleing the bulk of the first transistor from the ground during the hold phase; and discoupleing the gate of the first transistor from an input current input during the hold phase.

3. The method according to claim 1 wherein the first transistor is an NMOS transistor.

4. The method according to claim 1 wherein the first transistor is a PMOS transistor.

5. The method according to claim 1 comprising providing a sample and hold circuit;
   wherein the pair of current mirrors comprises a fifth transistor, a sixth transistor, a seventh transistor and an eight transistor;
   wherein the sample and hold circuit further comprises a second transistor, a third transistor, a fourth transistor, a ninth transistor, a tenth transistor, an eleventh transistor, and a first till eighth switches;
   wherein a source of the first transistor is coupled to one end of the first switch;
   a second end of the first switch is coupled to an input node of the sample and hold circuit, to first end of the eighth switch and to a first end of the seventh switch;
   a second end of the eighth switch is coupled to the ground;
   a second end of the seventh switch is coupled to a drain of the fifth transistor;
   the input node of the sample and hold circuit is coupled to an input current source;
   a gate of the first transistor is coupled to one end of the fourth switch and to a first end of the third switch;
   a second end of the fourth switch is coupled to a supply source;
   a second end of the third switch is coupled to a gate of the second transistor, to the drain of the second transistor and to a first end of the second switch;
   a second end of the second switch is coupled to a first end of the first switch and to a source of the first transistor;
   sources of the second transistor, the fourth transistor, the fifth transistor, the sixth transistor and the ninth transistor are grounded;
   sources of the third transistor, the seventh transistor and the eighth transistor are coupled to the supply source;
   gates of the third transistor, the seventh transistor and the eighth transistor are coupled to each other and to a drain of the eighth transistor;
   gates of the fifth transistor, the sixth transistor and the ninth transistor are coupled to each other, to a drain of the first transistor and to a first end of the capacitor;
   a second end of the capacitor is grounded;
   a drain of the seventh transistor is coupled to a drain of the fourth transistor, to a gate of the fourth transistor, and to a second end of the fifth switch;
   a bulk of the first transistor is coupled in parallel to first ends of the fifth and the sixth switches; and
   a second end of the sixth switch is grounded.

6. The method according to claim 5 comprising closing the first, fourth and seventh switches during the sample phase; opening the first, fourth and seventh switches during the hold phase; closing the second, third and eighth switches during the hold phase and opening the second, third and eighth switches during the sample phase.

7. The device according to claim 6 comprising grounding, during the sample phase, the bulk of the first transistor by the sixth switch; and coupling, during the hold phase and by the fifth switch, the bulk of the first transistor to the gate of the fourth transistor.

8. A device comprising: a pixel array and a sample and hold circuit configured to provide sampled current to the pixel array;
   wherein the sample and hold circuit comprises a first transistor, a capacitor and a pair of current mirrors; wherein the pair of current mirrors are coupled to the first transistor and wherein the capacitor is coupled to a drain of the first transistor;
   wherein the sample and hold circuit is configured to:
   sample an input current during a sampling phase to provide a sampled current, wherein the sampling comprises: providing the input current to the pair of current mirrors and allowing the capacitor to be charged to the capacitor voltage that is a function of the input current;
   store, during a hold phase, the capacitor voltage; wherein the capacitor voltage forces an output stage of the sample and hold circuit to output a current that is substantially equal to the sampled current; and
   utilize the pair of current mirrors to force the gate, source and drain voltages of the first transistor to be equal to each other during the hold phase.

9. The device according to claim 8 wherein the sample and hold circuit is configured to ground a bulk of the first transistor during the sampling phase; disconnect the bulk of the first transistor from the ground during the hold phase; and disconnect the gate of the first transistor from an input current input during the hold phase.

10. The device according to claim 9 wherein the pair of current mirrors comprises a fifth transistor, a sixth transistor, a seventh transistor and an eight transistor;
   wherein the sample and hold circuit further comprises a second transistor, a third transistor, a fourth transistor, a ninth transistor, a tenth transistor, an eleventh transistor, and a first till eighth switches;
   wherein a source of the first transistor is coupled to one end of the first switch;
   a second end of the first switch is coupled to an input node of the sample and hold circuit, to first end of the eighth switch and to a first end of the seventh switch;
   a second end of the eighth switch is coupled to the ground;
   a second end of the seventh switch is coupled to a drain of the fifth transistor;
   the input node of the sample and hold circuit is coupled to an input current source;
   a gate of the first transistor is coupled to one end of the fourth switch and to a first end of the third switch;
   a second end of the fourth switch is coupled to a supply source;
   a second end of the third switch is coupled to a gate of the second transistor, to the drain of the second transistor and to a first end of the second switch;
   a second end of the second switch is coupled to a first end of the first switch and to a source of the first transistor;
   sources of the second transistor, the fourth transistor, the fifth transistor, the sixth transistor and the ninth transistor are grounded;
   sources of the third transistor, the seventh transistor and the eighth transistor are coupled to the supply source;
   gates of the third transistor, the seventh transistor and the eighth transistor are coupled to each other and to a drain of the eighth transistor;
   gates of the fifth transistor, the sixth transistor and the ninth transistor are coupled to each other, to a drain of the first transistor and to a first end of the capacitor;
   a second end of the capacitor is grounded;

a drain of the seventh transistor is coupled to a drain of the fourth transistor, to a gate of the fourth transistor, and to a second end of the fifth switch;
a bulk of the first transistor is coupled in parallel to first ends of the fifth and the sixth switches; and
a second end of the sixth switch is grounded.

11. The device according to claim 10 wherein the first, fourth and seventh switches are closed during the sample phase and are opened during the hold phase; wherein the second, third and eighth switches are closed during the hold phase and are open during the sample phase.

12. The device according to claim 10 wherein during the sample phase the sixth switch grounds the bulk of the first transistor and during the hold phase the fifth switch couples the bulk of the first transistor to the gate of the fourth transistor.

* * * * *